ent OfficePatented June 24, 1969

3,451,478
NUCLEAR FRACTURING AND HEATING IN WATER FLOODING
Daniel Silverman, Tulsa, Okla., assignor to Pan American Petroleum Corporation, Tulsa, Okla., a corporation of Delaware
No Drawing. Filed Nov. 1, 1965, Ser. No. 505,984
Int. Cl. E21b *43/20, 43/26*
U.S. Cl. 166—272       9 Claims

ABSTRACT OF THE DISCLOSURE

A nuclear explosive device is detonated in a well at a level which results in fracturing of an oil-bearing formation. An oxygen-containing gas is injected into the fractured formation to burn some of the oil and generate heat. Water is then injected into an input well and oil is recovered from a producing well.

---

This invention relates to waterflooding oil-bearing formations. More particularly it relates to fracturing and heating low permeability oil bearing formations, or formations containing viscous oils, before waterflooding.

It has been suggested that the portion of an oil-bearing formation surrounding a well be heated and then the heat be carried through the formation with water. Underground combustion, for example, may be used to heat a portion of the formation. In formations having low permeability or highly viscous oils, it has been found to be almost impossible to force the heat through the formation. In both cases, the problem is that the formation or oil, or both, are characterized by a low rate of flow of the oil through the formation. It has been proposed to fracture such formations by a nuclear explosion which also provides heat, but it has been shown that insufficient heat is provided to be effective.

With these problems in mind, it is an object of this invention to provide an improved method for heating and waterflooding an oil-bearing formation. A more specific object is to provide a method for waterflooding a low permeability oil-bearing formation or one containing viscous oil. A still more specific object is to provide a method for fracturing, heating and waterflooding a low permeability formation containing viscous oil.

In general, I accomplish the objects of my invention by first detonating a nuclear explosive of either the fusion or fission type to fracture the formation and provide a limited amount of heat, then propagating an underground combustion through the formation outwardly away from the location of the nuclear explosion, to provide additional heat to the formation, and finally waterflooding the formation by injecting water near the location of the nuclear explosion, thus forcing oil outwardly to wells from which the oil is produced.

The characteristics of nuclear explosives and the techniques of their use in underground explosions are described in United States Bureau of Mines Report of Investigation 6494. In general, the explosive should be in the range from 1 or 2 kilotons to 1 or 2 megatons. That is, they should be equivalent to from 1 or 2 kilotons to 1 or 2 megatons of trinitrotoluene. Preferably, the explosion should be in the 10 to 100 kiloton range. The nuclear explosive is introduced through a well drilled into the formation. The nuclear explosion should be set off at a level in the well which will cause fracturing of the oil-bearing formation. The most effective location is opposite the formation itself. Since most of the fracturing seems to occur above the level of the device, it should be located near the bottom of the formation. If there is little or no bottom water, the nuclear explosion can even be detonated somewhat below the level of the formation.

After the nuclear explosion, the well through which the nuclear device was lowered into the formation may be recompleted or a new one may be drilled. In any event, an input well is provided into the fractured formation preferably into the chimney of broken formation caused by the explosion. Initially, the temperature will be sufficient to melt part of the rocks, so it will be sufficient to cause ignition of the hydrocarbons if contacted by an oxygen-containing gas. It is possible, however, that while reopening the old well or drilling a new one, sufficient cooling can take place so that additional ignition techniques may be required. These may include use of electric sparks, thermite, incendiary bombs, pyrophoric materials, such as triethyl borane or the like. The oxygen-containing gas is preferably air. The air may be mixed with natural gas or with recycled inert gases which lower the oxygen content to as low as about 5 percent by volume. Oxygen-enriched air can also be used, but is rarely economically justifiable.

It has been estimated that the 1.7 kiloton Rainier event explosive provided $8.5 \times 10^{11}$ calories or about $3.4 \times 10^9$ B.T.U. to the formation. Larger explosive charges, of course, provide larger amounts of heat, but the amount of heat released by a device usable in oil-bearing formations up to a few hundred feet in thickness is insufficient to maintain a temperature above about 300° F., as the heat wave is pushed through the formation by water to a producing well within a reasonable distance from the input well. A temperature of at least about 300° F. and preferably from about 500° F. to 1,000° F. is considered important to realize to the greatest extent the advantages of the fractured system for recovering oil. Vaporization of most of the oil is best for avoiding bypassing of large volumes of oil and thus assuring effective oil recovery. It will be obvious, then, that the underground combustion step is necessary to provide the required heat.

The nuclear explosion provides the fractured system which not only permits the effective propagation of the underground combustion through the formation, but also permits a sufficiently rapid flow of water to insure oil recovery at an economical rate. If the spacing between the input and output wells is short, on the order of 100 feet, then a single combustion operation followed by a single water drive is usually sufficient. If the spacing is greater, on the order of 200 to 300 feet, however, it is usually advisable to inject water and an oxygen-containing gas intermittently or simultaneously to continue some degree of combustion in the formation and thus maintain the desired elevated temperature as the water moves through the formation.

Even when the input and output wells are widely spaced, it will be apparent that a single combustion operation followed by a water drive will provide an improved recovery process. Therefore, it is possible to inject air or other oxygen-containing gas into the wells which will ultimately be oil producing wells. This will cause a combustion front to move from what will be the water input well near the location of the nuclear explosion toward the wells into which air is injected. This is frequently referred to as reverse combustion. It is generally preferred, however, that air be injected into the well at or near the nuclear explosion location to provide a direct combustion operation. Direct combustion is, of course, particularly preferred if the the air and water are to be injected intermittently or simultaneously. In either the reverse or direct combustion, an oxygen-containing gas is injected into the formation to support underground combustion which heats the formation. The water can be injected as a liquid or as steam. Steam has the advantage of providing additional heat to the formation. Liquid water is preferred, however, since it tends to decrease the rate of flow of oxygen-containing gas in the fractures and thus decreases bypassing of the oil.

The underground combustion may burn not only oil and gas already in place in the formation, but additional combustible materials introduced with the air or water, or separately introduced. For example, as mentioned above, injected air may be diluted by natural gases. Any hydrocarbon gases which are included will burn underground to provide a part of the required heat. This may be particularly desirable if an inexpensive natural gas is conveniently available since at least a portion of the required heat can then be provided by underground combustion of inexpensive natural gas rather than of the more valuable oil.

In my process, the nuclear explosion provides the fractures through which combustion products and viscous oil can move. These fractures might permit too rapid bypassing of portions of the formation in spite of the highly fractured nature caused by the nuclear explosion, except for the water. The liquid water decreases flow through the channels while providing the steam which distills the oil from the formation adjoining the fractures. Thus, the three steps, the nuclear explosion, the underground combustion, and the waterflooding, combine to provide a very advantageous process for recovering oil, particularly from low permeability formations containing highly viscous oils.

My invention will be better understood from the following example: An oil-bearing sandstone formation is 620 feet thick with the bottom 5,600 feet below the surface of the earth. A well is drilled into this formation to a depth of 5,500 feet. The well is 18 inches in diameter to total depth and a 14 inch casing is run to total depth and cemented. The permeability of the formation varies from about 20 millidarcies down to less than 1 millidarcy. The oil has a viscosity of about 2 centipoises at formation temperature.

Four producing wells are drilled on the corners of a square 330 feet on each side with the 18 inch well in the middle. These are completed 550 feet into the 620 foot thick formation. Some or all the wells may be hydraulically fractured before explosion of the nuclear device as described in more detail and claimed in U.S. patent application Ser. No. 483,749 which I filed on Aug. 30, 1965.

A 10 kiloton nuclear device 12 inches in diameter is lowered through the 14 inch casing in the center well to the bottom of the well at 5,500 feet. The well is cemented or stemmed with sand to the surface and the nuclear device is detonated. The casing is cleaned out until at about 4,800 feet the casing is found to be bent and damaged so it must be milled out to a depth of about 4980 feet where the mill enters the top of a small cavity below which a rubble-filled chimney of broken formation is contacted. A liner is set in the redrilled central well from 4,700 feet to 4,980 feet.

Triethyl borane is lowered into the central well to insure ignition of the oil. Compressed air at about 2,600 p.s.i. pressure is injected into the central well to continue the combustion. About 50 million cubic feet (standard conditions) of air per day are injected for 15 days. Then about 50,000 barrels (42 U.S. gallons per barrel) of water per day are injected for 3 days. These high injection rates are possible because of the highly permeable nature of the chimney of rubble provided by the nuclear blast. At the end of the water injection step the air injection is repeated, followed by water. These 2 steps are alternated for 6 cycles, after which only water is injected to carry out the heat and oil through the oil-bearing formation to the producing well.

I claim:
1. A process for recovering oil from an underground oil-bearing formation penetrated by at least one producing well and at least one other well into which a nuclear explosive device can be lowered, comprising detonating a nuclear explosive in said other well at a level which will result in fracturing said formation, providing an input well into said fractured formation, injecting an oxygen-containing gas through said input well into said fractured formation to support direct underground combustion whereby said formation is heated, injecting water through said input well to displace oil to said at least one producing well, and recovering oil from said at least one producing well.

2. The process of claim 1 in which said oxygen-containing gas is air.

3. The process of claim 1 in which said nuclear explosive is detonated opposite said formation.

4. The process of claim 1 in which a combustible gas is introduced into said other well to be burned and provide at least a portion of the required heat.

5. A process for recovering oil from an underground oil-bearing formation penetrated by at least one producing well and at least one other well into which a nuclear explosive device can be lowered, the formation and oil being characterized by a low rate of flow of oil through said formation, comprising detonating a nuclear explosive in said other well opposite said formation to form a chimney of broken formation, and fractures in said formation extending outwardly from said chimney to conduct oil more easily toward said at least one producing well, providing an input well into said chimney, injecting an oxygen-containing gas through said input well into said formation to support direct underground combustion in said formation whereby said formation is heated, injecting water through said input well and into said chimney, and recovering oil from said at least one producing well.

6. The process of claim 5 in which said oxygen-containing gas is air.

7. A process for recovering oil from an underground oil-bearing formation penetrated by at least one producing well and at least one input well into which a nuclear explosive device can be lowered, comprising detonating a nuclear explosive in said input well opposite said formation, recompleting said input well into the chimney of broken formation formed by the explosion, injecting an oxygen-containing gas through said input well and into said formation to support underground combustion and heat said formation, then injecting water through said input well and into said formation, and recovering oil from said at least one producing well.

8. The process of claim 7 in which said oxygen-containing gas is air.

9. The process of claim 7 in which said water is in the liquid form as it enters the formation.

References Cited

UNITED STATES PATENTS

| 2,788,071 | 4/1957 | Pelzer | 166—11 |
| 2,901,043 | 7/1959 | Campion et al. | 166—11 |
| 3,036,632 | 5/1962 | Koch et al. | 166—11 |
| 3,110,345 | 11/1963 | Reed et al. | 166—11 |
| 3,113,620 | 12/1963 | Hemminger. | |
| 3,163,216 | 12/1964 | Grekel | 166—11 |
| 3,171,479 | 3/1965 | Parrish et al. | 166—11 |
| 3,196,945 | 7/1965 | Craig et al. | 166—11 |

OTHER REFERENCES

Atkinson et al., "Atomic-age Fracturing May Soon Open Up Stubborn Reservoirs," The Oil & Gas Journal, Dec. 2, 1963, pp. 154–156.

Gary, "Is Thermal Recovery the Answer to Economic Production of Shale Oil?," World Oil, vol. 161, No. 2, August 1, 1965, pp. 98–101.

STEPHEN J. NOVOSAD, *Primary Examiner.*

U.S. Cl. X.R.

166—299, 305